United States Patent
Holst

[11] 3,973,588
[45] Aug. 10, 1976

[54] AIR OUTLET VALVE FOR DIVING APPARATUS

[75] Inventor: Rudolf Holst, Kastorf, Germany

[73] Assignee: Dragerwerk Aktiengesellschaft, Germany

[22] Filed: May 5, 1975

[21] Appl. No.: 574,698

[30] Foreign Application Priority Data

May 14, 1974 Germany............................ 2423289

[52] U.S. Cl................................. 137/854; 251/82; 251/323
[51] Int. Cl.² .................. F16K 24/02; F16K 15/18; F16K 17/02
[58] Field of Search ............... 251/82, 83, 321, 323, 251/339; 137/525

[56] References Cited
UNITED STATES PATENTS

| | | | |
|---|---|---|---|
| 161,002 | 3/1875 | Brown................................ | 137/519 |
| 1,385,058 | 7/1921 | Warter................................ | 251/82 |
| 2,322,521 | 6/1943 | Jenkins............................ | 251/323 X |
| 2,548,374 | 4/1951 | Janson............................ | 137/525.3 X |

Primary Examiner—Arnold Rosenthal
Attorney, Agent, or Firm—McGlew and Tuttle

[57] ABSTRACT

An air outlet valve for a diving apparatus includes a housing having an inlet and an outlet spaced from the inlet with a flow passage between the outlet and inlet having interior annular valve seat defined across the flow path. An axially extending actuation member is journalled in the housing for axial displacement and it includes an outside knob portion at one end and an inside knob portion at the opposite end which may be engaged for moving the actuation member. A flexible diaphragm which has an annular sealing rim portion which engages on the valve seat is secured at its central portion to a shaft portion of the actuation member and the sealing rim portion is engageable on the valve seat to close the flow passage. A pressure disk which has one or more openings therethrough is secured centrally to the shaft portion directly adjacent and on the outlet side of the diaphragm and it is biased by a spring in a direction toward the valve seat and urges the valve seat and presses the periphery of the diaphragm on the valve seat to close the passage.

7 Claims, 3 Drawing Figures

AIR OUTLET VALVE FOR DIVING APPARATUS

BACKGROUND OF THE INVENTION

1. Field of the Invention

This invention relates in general to the construction of valves and in particular to a new and useful valve for use with a diving apparatus such as a diving mask which has an axially displaceable actuation member with a knob portion at each end which may be actuated either inside or outside the mask and which includes a pressure disk carried by the actuation member which is biased by a spring against a valve closing diaphragm to seat it on a valve seat defined within the housing.

2. Description of the Prior Art

The present invention is particularly applicable for use with a diving apparatus of a type which includes a closing member which is loaded by a spring and which may be moved against the pressure force of the spring to actuate the valve. Diving apparatus is known which is equipped with spring loaded air outlet valves which in general are mounted on the diving helmet or mask. The air outlet valve comprises a valve disk having a conical rim which applies against the correspondingly shaped valve seat. The valve disk is loaded by a closing spring mounted at the downstream side of the air outlet valve and its biasing force may be adjusted by rotating a closure cap on its threaded connection to the valve housing and which bears against the one end of the spring. For this purpose the closure cap itself is provided with air passage bores and it must be secured to the outside of the housing by a threaded connection. The arrangement is such that the greater the screw cap is screwed into its housing the stronger is the closing force acting on the spring. The valve disk is provided with a stem which extends through the cap and which includes a hand knob on its exterior and a pressure knob on the interior so that the outlet valve can be opened from either side by engagement of a knob. The inside knob is advantageously mounted within the diving helmet so that it can be opened by the diver by pushing against it with his head. The valve thus operates as an automatic excess pressure valve through which at a pressure difference which depends on the biasing of the closing spring air is discharged. The known air outlet valve is disadvantageous insofar as for example by an unintentional actuation of the pushbutton from the inside of the apparatus the valve can be held in an open position without the diver being aware of it so that the water will penetrate into the diving apparatus through the open valve. This may happen for example during an accident or upon fainting of the diver if the valve mounted in the helmet is permanently held open by the diver's head.

Safety valves for diving apparatus are also known which are adapted to be opened by actuation knobs both from the inside and the outside. The valve port is followed on the outside by a system of channels which comprise curved passages forming a full spiral or screw line and which also extend out of the plane of the screw line and are intended to permit the water penetrating from the outside to form a water seal in any position of the valve and to also form an air cushion thereabove. With such a valve design it may be possible during the discharge of the air to prevent a simultaneous penetration of the water in an opposite direction. After an established balance of pressure between the outside and the inside, however, the water will flow into the helmet with the valve open. Consequently, upon an unintentional opening of the safety valve, the diver is not protected against drowning.

Another air outlet valve for diving apparatus is known which is intended to prevent a penetration of water into the diving suit during the discharge of air even if the valve is unintentionally permanently opened for example by the diver's head which is applied against the inside valve button following an indisposition or unconsciousness of the diver. In this air outlet valve upon actuation of a valve knob in the interior of the helmet an inner valve disk is lifted so that air may pass therethrough. The air passes into a space provided behind the valve disk. This space is closed by an outer valve disk which is loaded by a compression spring and by the water pressure. As long as the air pressure in the space is above the water pressure plus the contact pressure of the compression spring, the outer disk valve opens and air can escape. Upon equalization of the pressures at the outside and the inside of the disk valve the valve closes. This equalization always means a closing pressure of the compression spring relative to the water pressure. Thus upon unintentional pushing of the valve knob no water can penetrate into the helmet. A drawback of this air outlet valve is its considerable overall height due to the two springs mounted one after the other and this makes the design of the helmet difficult and also requires the provision of two valve disks. The disks must not be exposed to excessive mechanical stresses since they must remain operative.

Still another known air outlet valve for diving helmets comprises a closing member loaded by an adjustable compression spring and cooperating with a circular valve seat provided in the housing and which opens automatically upon being subjected to excessive internal pressure. This operation is independent of the position of the actuation knob at each end of the actuation member.

The closing member comprises an annular diaphragm clamped by its outer circumference in the housing and resting in the closing direction by its inner border on the valve seat. In addition a pressure piston is provided with openings therethrough which presses the inner border of the diaphragm into contact with the valve seat under the action of a compression spring. On its inside the piston is secured to the outer portion of the divided stem. On its outer extremity this stem portion carries the outer actuation knob. The free passage within the circular valve seat is closed by a sealing diaphragm to which the inner portion of the stem is secured. This portion of the stem is guided in a supporting member. The two stem portions cooperate with each other in the axial direction of motion through the inner sealing diaphragm. Therefore the valve can be opened by pushing against the inner actuation knob. Also the valve closes in the direction of the inner actuation knob movement as soon as the pressure from the outside exceeds the pressure within the driving helmet. In this air outlet valve difficulties arise with the narrow free cross-sectional area provided for the outflow of air from the helmet. Careful attention must be paid to the guidance of the two stem portions. The outer portion must be guided in the pressure piston in addition and the inner portion must be connected to the sealing diaphragm and the diaphragm must remain elastic and tight.

This invention relates to a mechanically simple and rugged air outlet valve which has favorable flow conditions and which in accordance with the known operation requirements can be operationally opened from the outside and from the inside. However upon opening by mistake the valve will operate without the leakage of water into the mask or helmet even in cases when the inner and outer pressures are equalized.

In accordance with the invention the closing member comprises a diaphragm which is coaxially tightly secured to the stem and adapted to apply in the closing direction with its outer sealing rim against the valve seat. A pressure disk is secured to the stem directly behind the diaphragm in respect to the closing direction and it is provided with openings and is adapted to press the outer sealing rim against the valve seat under the action of a compression spring which bears against the disk. The construction produces a substantial advantage in respect to the large free cross-sectional area of the outlet opening which can be maintained. This is obtained by forming a housing with a valve seat close to its interior wall so that the entire free cross sectional area or flow passage is determined by the inner diameter of the housing and the diameter of the seat formed therein. The valve actuating member or stem is made in one piece and is securely guided for axial displacement by a bearing adjacent the inlet and another bearing adjacent the outlet of the housing. Thus even if the knob formations at each end of the actuating member are engaged so that they are pressed in a direction out of axial alignment the stem will still move without any great friction or difficulty.

In order to obtain a satisfactory sealing at the valve seat and in order to fasten the diaphragm to the stem the thickness of the outer sealing rim and the inner holding collar of the diaphragm is increased. This increases the operational stability and life expectancy of the diaphragm. The exterior knob portion of the actuation member is advantageously designed as a bow which conforms to the shape of the screw cap which is threadedly secured to this end of the housing. The actuation of the air outlet valve is not affected by this design but the design offers the advantage that the exposed knob will not become entangled with other objects such as cables, etc. but the cables will glide over the smooth surface without being caught. This makes the entire diving apparatus substantially accident proof.

Accordingly it is an object of the invention to provide a valve construction particularly for diving apparatus which includes a valve actuating member with a stem portion which is journalled for sliding movement within the housing of the valve and which has a knob at each end and which includes a diaphragm which is secured centrally to the stem portion of the actuating member and has an annular sealing rim portion which engages against a valve seat which is formed within the housing between an inlet and an outlet and wherein the shaft portion of the actuating member also carries a pressure disk which is biased by a spring member against the diaphragm to cause a pressing of the sealing rim on the valve seat.

A further object of the invention is to provide a valve which may be used with diving apparatus having a characteristic so that it will not be opened unintentionally to permit leakage of water into a diving mask and which will operate safely during all diving operational conditions and which includes an actuating member formed with an exterior knob which conforms to the housing configuration so that it will not become snagged.

A further object of the invention is to provide a valve for use with diving apparatus which is simple in design, rugged in construction and inexpensive to manufacture.

The various features of novelty which characterize the invention are pointed out with particularity in the claims annexed to and forming a part of this disclosure. For a better understanding of this invention, its operating advantages and specific objects attained by its uses, reference should be had to the accompanying drawings and descriptive matter in which there is illustrated a preferred embodiment of the invention.

GENERAL DESCRIPTION OF THE PREFERRED EMBODIMENT

Figure 1:
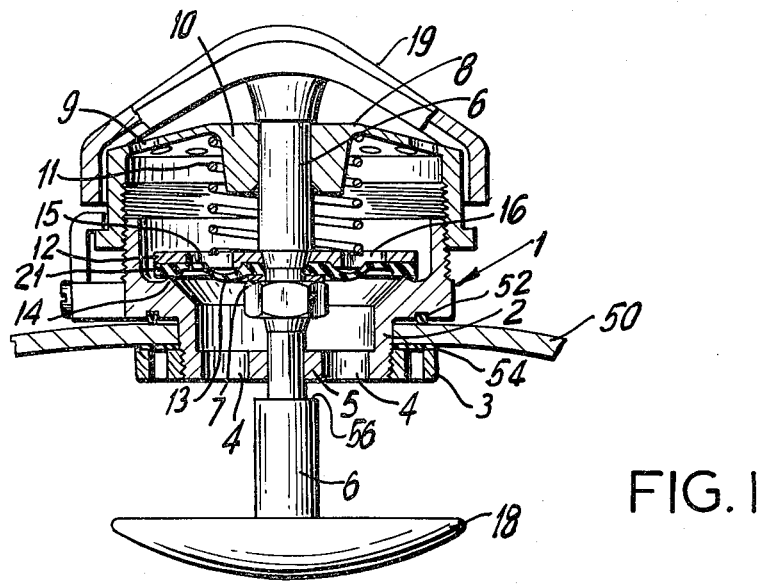
FIG. 1 is a longitudinal sectional view of a diving helmet having a valve constructed in accordance with the invention.

Referring to the drawings in particular the invention embodied therein comprises a valve housing generally designated 1 which is secured in a wall 50 of a diving mask or a diving helmet which is only partially shown. The valve housing 1 is secured to the wall 50 by means of a threaded ring nut 3 and sealing rings 52 and 54. The ring nut 3 is threaded to the lower end of the housing 1. The valve housing 1 has an inlet with air passage openings 4 at its one end and it has an outlet defined in a separate screw cap portion 8 with air outlet openings 9.

In accordance with the invention an actuating member which includes a shaft or stem portion 6 is supported for axial displacement on a first bearing 5 adjacent the inlet and by a second bearing 10 which is formed in the cap 8 adjacent the outlet. A compression spring 11 engages at one end against the cap 8 and it bears at its opposite end against a pressure disk 12. The force of the compression spring 11 may be varied by adjusting the threaded position of the cap on the housing 1.

In accordance with a feature of the invention a diaphragm valve 13 includes a thickened central portion or holding collar 17 which is secured to the stem 6 and an outer sealing rim 21 which engages on an annular valve seat 14 which is defined in a flow passage extending from the inlet to the outlet within the housing. In the closed position the pressure disk 12 presses the outer sealing rim 21 of the diaphragm 13 into contact with the valve seat 14. The design of the housing is such that the valve seats 14 of maximum diameter since it is located close to the interior wall of the housing 1. The pressure disk 12 is provided with openings 16 so that the upper surface 15 of the diaphragm is additionally loaded with the pressure of the water.

The actuating member carries an inner actuating knob portion 18 which is located inside the mask or diving helmet and it has at its opposite end an outer actuating knob portion which is shaped as a bow 19.

The shape of the bow 19 conforms to the outer shape of the screw cap 8 and it is made with smooth surfaces so that it is not liable to snag against any object.

Figure 2:
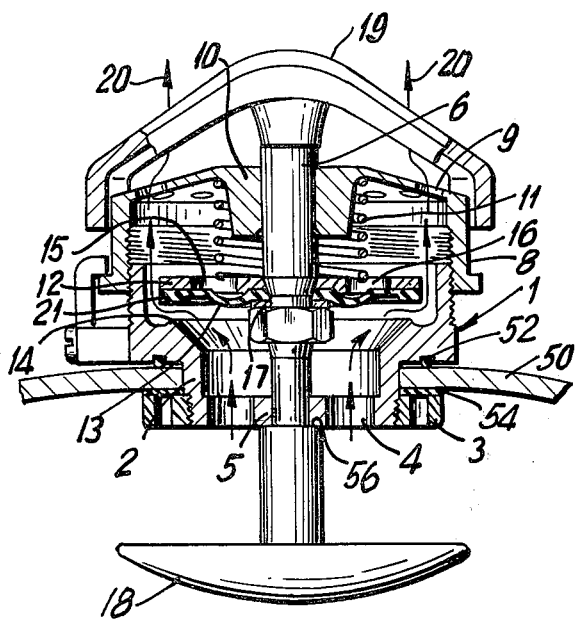
FIG. 2 is a view similar to FIG. 1 showing the valve in another operating position.

In FIG. 1 the air outlet valve is in a closed position. Due to the action of the compression spring 11 the pressure disk 12 applies against the outer sealing rim 21 of the diaphragm 13 and presses the diaphragm which when the device is below the water surface is exposed to the additional water pressure acting on the circular valve seat 14. With an air pressure in the diving helmet which is in excess of the outside pressure, the diaphragm 13 is lifted along with a pressure disk 12 and the stem portion 6. In this position the air escapes in the direction of the arrows 20 as shown in FIG. 2. The desired pressure in excess which will be in the helmet and thereby the operating pressure is adjusted by turning the screw cap 8 and varying the force on the spring 11.

The air outlet valve may be opened by pulling the knob portion 19 from the outside or by pushing the inner actuation knob 18 from the inside. The air outlet valve can be opened that is the diaphragm 13 can be lifted from its valve seat 14 only as long as the air pressure in the interior of the diving helmet exceeds the pressure acting on the diaphragm 13 from the outside. This outside pressure will equal the addition of the water pressure and the pressure of compression spring 11. Thus even upon an unintentional pushing of the inner actuation knob 18 from the inside or a pulling of the knob portion 19 from the outside the moving stem 6 with the pressure disk 12 will move outwardly but the diaphragm 13 will remain applied by its outer sealing rim 21 against the valve seat 14. This means that in all cases there will be no break-in of water into the diving helmet by accident. This condition is represented in FIG. 3 where it can be seen that the valve diaphragm will flex centrally upwardly along with the stem 6 but the sealing rim portion 21 will not lift off the valve seat.

Figure 3:
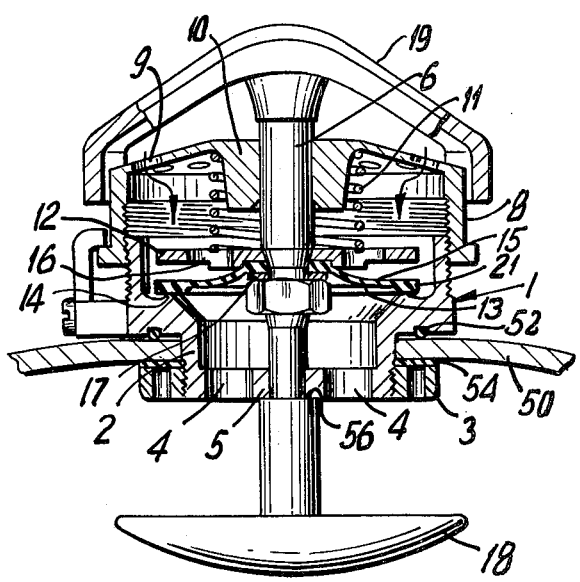
FIG. 3 is a view of the valve shown in FIG. 1 in still another operating position in which the valve is closed by the outside pressure while the stem is pulled or pushed outwardly.

A shoulder portion 56 of the stem 6 will limit the movement of the actuation member to the positions shown in FIGS. 2 and 3 and in an opposite direction the outer knob portion 19 will contact the housing cap portion 9 in the opposite limit of movement of the actuation member.

While a specific embodiment of the invention has been shown and described in detail to illustrate the application of the principles of the invention, it will be understood that the invention may be embodied otherwise without departing from such principles.

What is claimed is:

1. An air outlet valve for diving apparatus comprising a housing having an inlet, an outlet spaced from said inlet, and a flow passage in said housing extending from said inlet to said outlet, an interior annular valve seat defined within said housing across the flow passage, an actuation member having a shaft portion extending axially through said housing and an engageable outside and inside knob portion adjacent the respective ends of said shaft portion, journal means in said housing supporting said shaft for axial displacement of said actuation member, a flexible valve diaphragm in said housing having an annular valve seat engaging-sealing rim portion and being secured centrally to said shaft portion and engageable with said valve seat to close said flow passage, a pressure disk secured centrally to said shaft portion directly adjacent and on the outlet side of said diaphragm, spring means acting on said disk in a direction toward said valve seat causing said disk to press said outer rim portion of said diaphragm on said valve seat, said actuation member being displaceable to move said disk toward and away from said valve seat.

2. An air outlet valve according to claim 1, wherein said pressure disk has at least one opening therethrough, said diaphragm having a central collar portion secured to said shaft portion, said collar portion and said sealing rim being of increased thickness from the remaining portion of said diaphragm.

3. An air outlet valve according to claim 1, where said outside knob portion is of bow-shaped configuration.

4. An air outlet valve according to claim 1, wherein said housing includes a main body portion having said valve seat, said valve seat being formed at the interior of said main body portion close to the interior walls thereof so that substantially the whole interior of said valve housing forms a flow passage, and a cap portion threaded to said body portion, said spring means including a spring engaged at one end against a cap portion and at its opposite end against said disk, said cap portion being threadable on said body portion for varying the force of said spring.

5. An air outlet according to claim 4, wherein said cap portion is substantially cylindrical and includes an end portion with a central projecting portion forming a first journal of said journal means, said journal means also including an opposite journal formed in said housing body adjacent the inlet thereof.

6. An air outlet valve according to claim 5, wherein said outside knob portion includes a bow shaped end connected to said shaft portion having ends engaged over each side of said cap portion and being curved outwardly from each side to a smooth end portion connected to said shaft portion.

7. An air outlet valve according to claim 1, wherein said shaft portion of said actuating member includes a threaded part adjacent said diaphragm, and a nut threadable on said shaft portion engageable with said diaphragm which may be tightened in a direction toward said disk to hold said diaphragm to said shaft portion.

* * * * *